United States Patent
Lemery et al.

[15] 3,682,561
[45] Aug. 8, 1972

[54] CUTTER TOOTH MOUNTING FOR FINE WEAR ADJUSTMENT

[72] Inventors: Raymond E. Lemery; John G. Gilmore, both of c/o The Ingersoll Milling Machine Company, 707 Fulton Ave., Rockford, Ill. 61101

[22] Filed: Jan. 18, 1971

[21] Appl. No.: 107,099

Related U.S. Application Data

[63] Continuation of Ser. No. 802,863, Feb. 27, 1969, abandoned.

[52] U.S. Cl. ................................................ 408/153
[51] Int. Cl. ............................................ B23b 29/03
[58] Field of Search ..................... 408/153, 154, 16

[56] References Cited
UNITED STATES PATENTS

3,457,811  7/1969  Lemery et al ............... 408/16

*Primary Examiner*—Gerald A. Dost
*Attorney*—Wolfe, Hubbard, Leydig, Voit & Osann

[57] ABSTRACT

A material cutting tooth is mounted on a rotatable body and adjusted outwardly in fine increments to compensate for wear by turning a selectively rotatable screw shaft having threads of different pitch respectively mating with the body and a holder splined into the body and supporting said tooth in cutting position. Outward adjustment of the tooth is effected by turning of a disk slidably coupled to the screw shaft but held axially fixed during the outward adjustment of the tooth.

4 Claims, 7 Drawing Figures

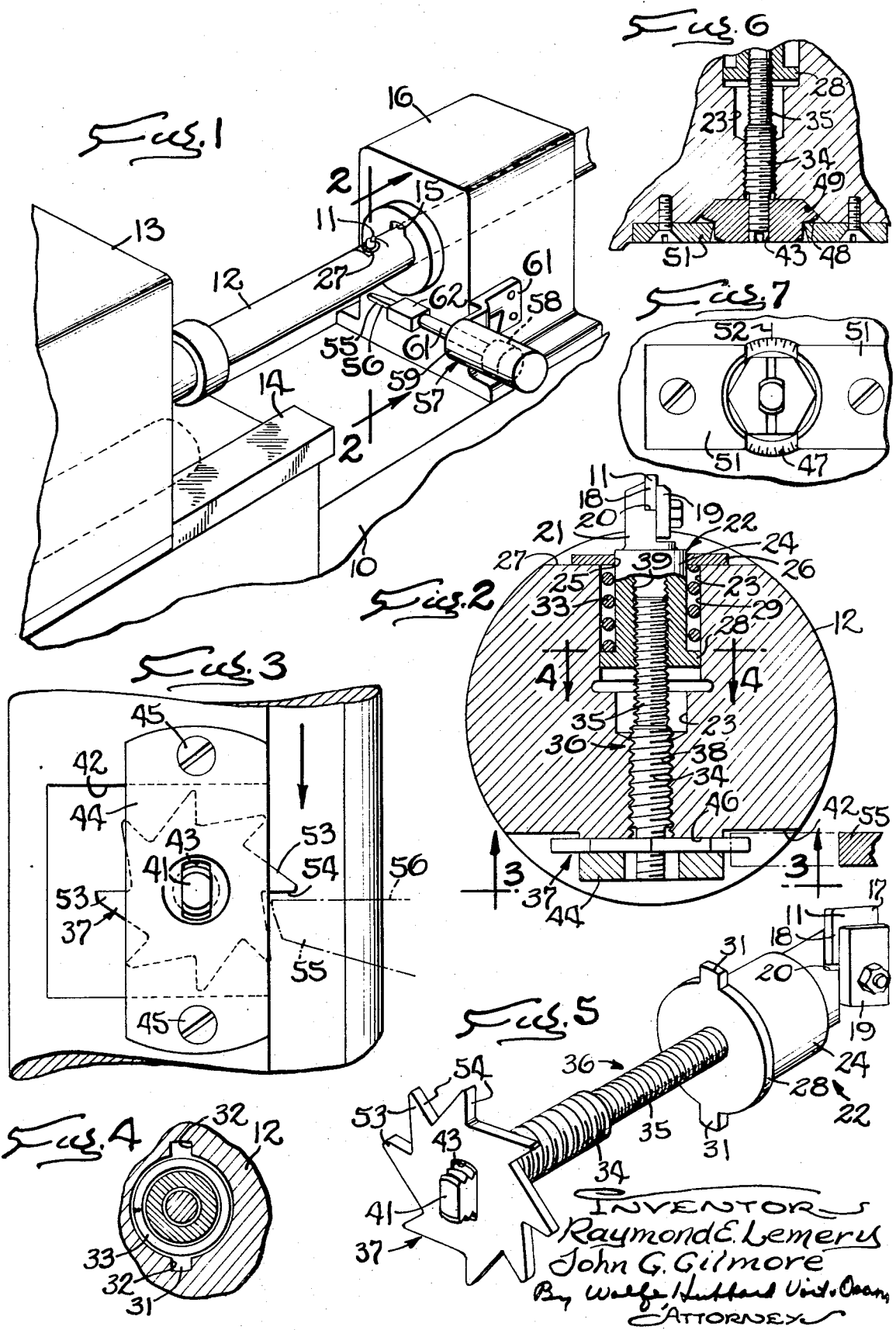

3,682,561

CUTTER TOOTH MOUNTING FOR FINE WEAR ADJUSTMENT

CROSS-REFERENCE TO RELATED APPLICATION

This application is a continuation of our application Ser. No. 802,863, filed Feb. 27, 1969 and now abandoned.

BACKGROUND OF THE INVENTION

The tooth of a material cutting tool has been mounted heretofore on a rotary body for outward wear adjustment by turning an outwardly exposed member coupled to a screw shaft which carries the tooth and is adjustable in fine increments of predetermined lengths through a speed reducing device such as a worm or a different screw. Adjustable mountings of this general character are disclosed in U.S. Pats. Nos. 2,125,005 and 3,457,811.

SUMMARY OF THE INVENTION

The present invention greatly simplifies the construction and mounting and increases the compactness of cutting tooth holders and fine tooth adjusters of the above character. This is accomplished by supporting the cutting tooth on the outer end of a nut slidably splined in one end of a hole in a rotatable body and threaded onto one end of a differential screw extending through a hole in the body. A thread of the same but greater pitch on the other end portion of the screw mates with a thread in the other end of the hole so that by turning a member spline coupled to such other end and held axially fixed, the screw may be turned to effect fine outward adjustment of the cutting tooth.

BRIEF DESCRIPTION OF THE DRAWINGS

FIG. 1 is a fragmentary and somewhat schematic plan view of a boring machine embodying the novel features of the present invention.

FIG. 2 is a section taken along the line 2—2 of FIG. 1.

FIGS. 3 and 4 are views taken respectively along the lines 3—3 and 4—4 of FIG. 2.

FIG. 5 is a perspective view of one form of the tooth adjusting mechanism.

FIG. 6 is a view similar to FIG. 2 showing a modified form of actuator for the tooth adjuster.

FIG. 7 is an end view of FIG. 6.

DESCRIPTION OF THE PREFERRED EMBODIMENTS

The invention is shown in the drawings incorporated in a machine of the type commonly used for finish boring holes in a workpiece secured to and located accurately in a fixture on a bed structure 10, an example of such machine being disclosed in U.S. Pat. No. 3,457,811. The boring is effected by the tip of a tooth 11 projecting radially from a tool spindle or shaft 12 supported cantilever fashion on a head 13 which is slidable back and forth along ways 14 formed on the bed. During a boring cycle, the boring bar, while accurately positioned angularly, is rapidly advanced to move the cutting tooth into and along a slot 15 in a bearing structure 16, enlargement of the work bore being effected while the bar is being rotated and is fed forwardly to advance the rotating teeth through the work bore. After the boring, rotation of the bar is interrupted with the tooth alined with the slot 15, the bar then retracted rapidly to the starting position.

Herein each cutting tip 17 is formed by an exposed corner of an indexable wafer 18 of a cutting material secured by a screw actuated clamp 19 in a socket 20 on the leading side of the outer end portion 21 of a holder 22 which is mounted in a transaxially extending hole 23 in the spindle and adapted for outward adjustment in fine increments, for example 0.0001 or 0.0002 of an inch. For this purpose, the cylindrical intermediate portion 24 of the holder is slidable through and guided accurately by the internal wall 25 of the washer 26 axially alined with the hole 23 and secured in a recess 27 cut in the side of the spindle. A flange 28 at the inner end of the holder is guided along the cylindrical end portion 29 of the hole 23. Lugs 31 project from diametrically opposite sides of the flange 28 (See FIGS. 4 and 5) into longitudinal grooves 32 in the hole wall and thus hold the holder 22 and the tooth 11 against turning relative to the spindle. The holder is continuously urged endwise and radially and inwardly along the hole 23 by a spring coil 33 compressed between the washer 26 and the flange 28. Backlash between the mating threads on the screws, the holder and the body is thus taken up so that the position of the cutting tooth is fixed precisely relative to the cutter body without the necessity of clamping the holder to the body.

Through the advantageous use of two screws 34 and 35 having threads of different pitch on a common rotary shaft 36, provision is made, in accordance with the present invention, for outward adjustment of the tooth 11 in extremely fine increments (0.0001–0.0002 of an inch) in response to turning through predetermined angles of substantial magnitude of an adjuster 37 exposed on the side of the boring bar diametrically opposite from the cutting tooth and spline coupled directly onto the screw 34. The thread of the screw 34 is the one of greater pitch, of the same hand as the screw 35 and formed on the exterior of the screw shaft to mate with an internal thread 38 on a part of the cutter body which does not rotate during the fine adjustment of the tip 17 by turning of the differential screw. Thus, the thread may be on a part of the boring bar and in this instance, this thread is rigid with the bar and formed in the end portion of the hole 23 opposite the cutting tooth.

Preferably and as shown herein, the threads of the screws 34, 35 are formed on opposite end portions of the shaft 36, and the thread of the second screw of the shorter pitch mates with an internal thread 39 along the interior of the tubular inner end portion of the tooth holder 22. Herein the screw shaft is spline coupled to the adjuster 37 by telescoping the flattened outer end portion 41 of the shaft in hole 43 of complemental shape in the adjuster.

In both of the forms shown, the adjuster takes the form of a disk which is disposed in the recess 42 and held in axially fixed position by a plate 44 detachably secured by screws 45 against the bottom 46 of the recess. The adjuster disk is thus free to turn relative to the boring bar 12 and turn the screw shaft so that the different screw pitches of the same hand coact to transmit the disk motion to the cutting tooth at a greatly reduced rate determined by the pitch differences. For example, with thread pitches of 0.0500 and 0.0492 inches and of the same hand on the screws 34 and 35, the cutting tooth will be set out 0.0001 of an inch in response to turning of the adjusting disk 37 counterclockwise through an angle of 45°.

Turning of the adjusting disk through accurately measured angles may be effected either automatically in an automatically executed cycle of the boring machine shown in FIG. 1 or manually by constructing the disk with marks 47 or other suitable indicia formed on and uniformly spaced angularly around the periphery of an exposed face 48 of the disk as shown in FIG. 7. In this form, the frustoconical inner end of the disk is received in a seat 49 in the boring bar and held therein frictionally by the pressure of retaining plates 51 which overlie and bear against the inner edge of the marked surface of the disk. By turning the disk through a given angle gaged by reference to the marks 47 and a point 52 fixed on the boring bar, it will be apparent that the cutting tooth may be adjusted outwardly by a selected and predetermined increment.

By retaining the adjusting disk 37 in a fixed axial plane, step by step indexing of the disk may conveniently be effected automatically during the axial shifting of the boring bar 12 in the course of an automatically executed cycle of the boring machine. For example, as disclosed in the aforesaid application, this may be accomplished by making the disk in the form of a star wheel having radially projecting teeth 53 with surfaces 54 disposed in radial planes and of uniform angular pitch corresponding to the turning of the disk required to produce the desired increment of outward adjustment of the cutting tooth in each indexing step.

The plate 44 which cooperates with the bottom 46 of the recess 42 to maintain the fixed axial position of the wheel as the screw shaft 36 is advanced is somewhat narrower in width than the diameter of the wheel so that, in all indexed positions, at least one tooth projects beyond the edge of the plate as shown in FIG. 3. Thus, this tooth is exposed for engagement by a stop or pawl 55 which is mounted on the boring machine for back and forth movement transversely of the boring spindle between a retracted and inactive position shown in FIG. 1 and advanced or blocking position shown in phantom in FIG. 3. Such movements are effected by a reversible actuator 57 which may include a piston 58 slidable in a cylinder 59 fixed to the machine frame through a bracket 61. Herein, the stop comprises the free end of a bar 56 constituting an extension of the piston rod 61 and slidable in a guide 62 holding the stop in the plane of the star wheel which is disposed on the underside of the boring bar with the face 54 of the exposed tooth 53 positioned for engagement with the stop and to be blocked thereby during retraction of the boring bar in the direction indicated by the arrow in FIG. 3. After such engagement, the retracting motion of the bar is utilized to turn the wheel counterclockwise until the end of the tooth rides off from the stop after turning through an angle predetermined by the pitch and lengths of the wheel teeth.

Under the control of suitable mechanism disclosed in the aforesaid U.S. Pat. No. 3,457,811, the stop may be advanced and retracted by the admission of pressure fluid to the head and rod ends of the cylinder 59 at proper times in the cycle of the boring machine. In this instance, the cutting tooth adjustment is effected during retraction of the boring bar, the stop being projected into active position before the star wheel reaches this position and retracted before the advance of the boring bar in the next machine cycle.

From the foregoing, it will be apparent that through the use of the screws 34 and 35 of different pitch, an extremely great reduction is effected in the transmission of the angular turning motion of the star wheel 37 to the cutting tooth holder 24. No other motion reducing devices are required to effect adjustment of the cutting tooth in the desired fine increments in response to indexing of the disk through substantial angles. Extreme radial compactness is thus achieved through parts which may be manufactured with the required precision and mounted in the boring bar at very low cost.

By mounting the adjusting disk 37 directly on the screw 35 and retaining the same in a fixed axial plane, the improved adjusting mechanism may be utilized to advantage in automatic machine tools where it is desired to adjust a cutting tooth in selected ones of successive machine cycles.

We claim:

1. A mounting for supporting a cutting tooth for adjustment in fine increments having, in combination, a rotatable body having a hole extending therethrough, an internal thread disposed in and extending along one end portion of said hole and normally fixed relative to said body during fine adjustment of said tooth, a nonrotatable holder disposed within and slidably guided along the other end portion of said hole and having an internal thread, said tooth being secured to the outer end of said holder and providing a tip for cutting engagement with a workpiece during rotation of said body, an elongated screw disposed within and extending along the axis of said hole and having on one end portion a first external thread mating with said internal thread on said body, the opposite end portion of said screw having a second external thread disposed within and mating with the internal thread in said holder, the thread of said screws having different pitches of the same hand, means turning said screw to advance the screw and said cutting tooth in one direction relative to said body through the medium of one of said threads while moving said holder through the medium of said second thread a different axial distance relative to said body in the opposite direction, said screw turning means comprising a disk-like member slidably coupled to said screw to turn therewith, and means secured to said body and retaining said member substantially in a fixed axial plane during turning of the member to advance said screw axially.

2. A cutting tool as defined in claim 1 including formations on and spaced circumferentially around said member for determining the extent of step by step turning of the member.

3. A cutting tool as defined in claim 1 and adapted for boring a hole in a workpiece, said body comprising an elongated rotatable shaft, all parts of said adjusting member and said retaining means being disposed within a cylinder concentric with the axis of said shaft and having a radii less than that of said cutting tip.

4. A cutting tool as defined in claim 1 in which said member is a wheel having projections spaced equidistantly around the wheel and screw axis for enabling the wheel to be turned in angular steps of predetermined lengths and the extent of the increments of tooth adjustment gaged accurately.

* * * * *